H. R. KENNEDY.
HOLDER FOR GREASE GUNS.
APPLICATION FILED APR. 12, 1921.
1,418,263. Patented May 30, 1922.
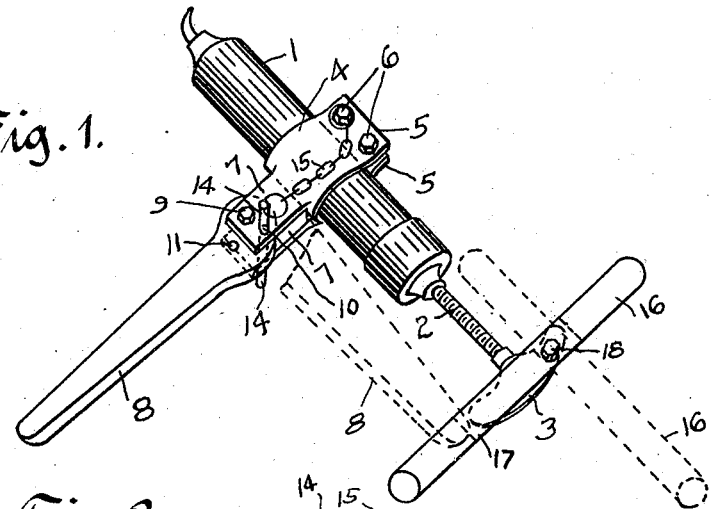
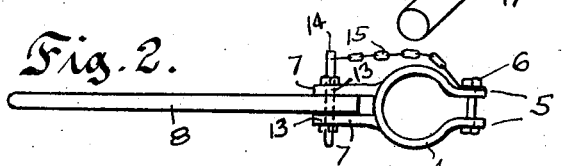
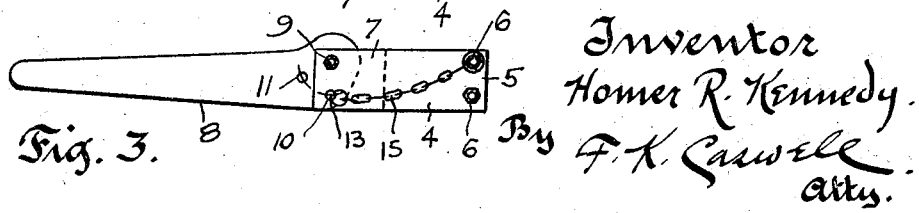
Inventor
Homer R. Kennedy.
By F. K. Caswell
Atty.

UNITED STATES PATENT OFFICE.

HOMER R. KENNEDY, OF LOS ANGELES, CALIFORNIA, ASSIGNOR OF ONE-HALF TO G. M. KENNEDY AND ONE-HALF TO J. J. MATHE, BOTH OF LOS ANGELES, CALIFORNIA.

HOLDER FOR GREASE GUNS.

1,418,263.

Specification of Letters Patent. Patented May 30, 1922.

Application filed April 12, 1921. Serial No. 460,791.

*To all whom it may concern:*

Be it known that I, HOMER R. KENNEDY, a citizen of the United States, and a resident of Los Angeles, in the county of Los Angeles and State of California, have invented certain new and useful Improvements in Holders for Grease Guns, of which the following is a specification.

My invention relates to holders adapted to hold firmly and conveniently any cylindrical body and particularly pertains to providing a means whereby grease guns may be held securely in any desired position without soiling the hands. In the various types of grease guns as at present made, it is necessary to hold the same in the hands, and as they become greasy almost immediately after being put into use, and as it takes an extremely firm grip to hold them from rotating while forcing the grease through them, it is very difficult to hold them at all and impossible to hold them without soiling the hands. Another objection to the present forms of grease guns which my invention is intended to eliminate, is the degree of force required to operate the handle and force out the grease. This is due not only to the resistance of the grease in passing through the nozzle but also to the small and short handle heretofore used, the said handles having been designed to occupy a minimum space in a tool box. My invention includes a detachable or swinging handle capable of being quickly attached to the handle already furnished, and means for folding and locking same either in position for operating, or for storing in a minimum space.

My invention also includes a handle which may be clamped either permanently or temporarily to the grease gun, providing a clean handle of much greater leverage and if desired, capable of being folded so as to occupy a minimum of space in a tool box.

My invention is illustrated by the accompanying drawings, in which Figure 1 is an isometric view of the preferred form of my invention applied to a grease gun and showing a method of folding the combination lever and clamp, and of folding the handle. Figure 2 is a detailed plan view of the combination lever and clamp shown in Figure 1. Figure 3 is a detailed side elevation of the combination lever and clamp shown in Figure 1. The dotted lines show the various elements in their folded position. Similar numerals refer to similar parts in the several views.

Referring more particularly to the drawings and especially to Figures 1, 2 and 3: 1 is the body of a grease gun of the usual type; 2 is the piston screw of the said grease gun, and 3 the handle of the type usually provided. 4 is a clamp, preferably of metal and having an inner surface curved or of a shape adapted to grip the body 1 of the grease gun and which it wholly or partially surrounds. The said inner surface of the clamp 4 may be lined with friction material adapted to prevent the grease gun body 1 from slipping in the clamp 4, or said inner surface may be roughened or knurled for the same purpose. Integral with the clamp 4 extending outwardly on one side of the grease gun body and transversely to the axis of the same, are two lugs 5. The two lugs 5 are approximately parallel to and slightly separated from each other and are provided with means, such as one or more bolts 6, for drawing them toward each other, thus causing the clamp 4 to tightly grip the body of the grease gun 1. On the side of the clamp 4 opposite to the lugs 5, are two similar lugs 7. These lugs 7 are preferably integral with the clamp 4, extending transversely outward from said clamp 4 and grease gun body 1, and are also approximately parallel and separated sufficiently to allow the insertion of the combination lever and handle 8. The handle 8 is pivotally mounted between the lugs 7 and on the bolt or pin 9. The inner end of the handle 8 is enlarged and provided with two holes 10 and 11 capable of being brought into registry with a hole 13 in the lugs 7. When the lever handle 8 is in position for holding and operating the grease gun, said position being one approximately at right angles to the axis of the gun, the hole 10 is in registry with the hole 13 and the said handle 8 may be locked in this position by the insertion of the pin 14 through the holes 10 and 13. When the lever handle 8 is swung on its pivot 9 into a position approximately parallel to the axis of the grease gun 1 the hole 11 comes into registry with the holes 13 and may be locked in this position by the insertion of the same locking pin 14. The locking pin 14 may be secured to the clamp 4 by any convenient means, such as the chain 15. Instead of the pin 14 a spring latch may be used without departing from the spirit of my invention. The clamp 4 may also be made of two pieces bolted or hinged together, or the clamp may be made in form of a U whose ends form the lugs 7, the same being clamped onto the body 1 by tightening the bolt 9. 16 is an auxiliary handle or grip adapted to be attached to the ordinary handle 3 by any convenient means such as shown in Figure 1, in which 17 is a slot provided with a bolt or bolts 18, which when tightened cause the sides of the slot 17 to approach each other and in so doing grip the handle 3. In the form shown in Figure 1, a hole is drilled in the ordinary handle 3 and the bolt 18 passed through the auxiliary handle and the ordinary handle 3, serving as a pivot which allows the auxiliary handle 16 to be folded back parallel to the body of the gun 1.

The combined clamp and lever handles 8 may be made of any desired material such as wood or solid, hollow or stamped metal. Their detailed form may vary without departing from the spirit of my invention, as the essence of my invention is to provide a holder with leverage and means for clamping same to the grease gun.

In operating the form of my invention shown in Figures 1, 2 and 3, the bolts 6 are loosened and the clamp 4 slipped over the body of the grease gun 1. The bolts 6 are then tightened thus clamping the holder securely to the grease gun. The lever handle 8 being in the dotted position, parallel to the body 1 of the gun, the pin 14 is withdrawn, the lever handle 8 swung around until the hole 10 comes into registry with the holes 13 in the lugs 7; the pin 14 is then inserted through the lugs 7 in the holes 13 and 10, thus locking the lever handle in its operating position. The bolt 18 of the auxiliary handle being tightened sufficiently to cause a friction between the said auxiliary handle 16 and the ordinary handle 3, the auxiliary handle 16 is then swung around until its position coincides with that of the handle 3, when it is ready for use. The grease gun 1 is then held by means of the lever handle 8 in one hand, and the piston screw turned by means of the auxiliary handle 16 in the other hand.

It is obvious that many changes and modifications may be made in my invention, such as integrally forming the handle member and the barrel of the grease gun without using the clamping members 4, all of such modifications being made without departing from the true spirit of the invention.

What I claim as my invention and desire to secure by Letters Patent is:

1. In a grease gun holder, a clamp, means for securing said clamp to said grease gun, a lever handle pivotally mounted on said clamp and means for locking said lever handle in a position approximately parallel or approximately transverse to the axis of said grease gun, all substantially as shown and described.

2. In a grease gun holder, a clamp, means for securing said clamp to said grease gun, a lug or lugs on said clamp, a lever handle pivotally mounted on or in said lug or lugs, holes in said lug or lugs and in said lever handle adapted to be brought into registry, and a locking pin adapted to be inserted in said holes to secure said lever handles in various positions.

3. In a grease gun holder, a clamp, means for securing said clamp to said grease gun, a lever handle pivotally mounted on said clamp, means for locking said lever handle in one or more positions relative to the longitudinal axis of said grease gun.

HOMER R. KENNEDY.

Witnesses:
  LE ROY JONES,
  JOHN ZINZ.